455-614 AU 263 EX
3/5/85 OR 4,503,564

United States Patent [19]
Edelman et al.
[11] Patent Number: 4,503,564
[45] Date of Patent: Mar. 5, 1985

[54] OPTO-ACOUSTIC TRANSDUCER FOR A TELEPHONE RECEIVER

[76] Inventors: Seymour Edelman, 9115 Glenridge Rd., Silver Spring, Md. 20910; Aime S. DeReggi, 21000 Clarksburg Rd., Boyds, Md. 20720

[21] Appl. No.: 423,128
[22] Filed: Sep. 24, 1982
[51] Int. Cl.³ .............................................. H04B 9/00
[52] U.S. Cl. .................................... 455/614; 179/180; 455/619
[58] Field of Search ............................... 455/614, 619; 179/110 R, 115 R, 181 R, 180, 182 R; 181/174

[56] References Cited

U.S. PATENT DOCUMENTS

| | | | |
|---|---|---|---|
| 235,199 | 12/1880 | Bell | 455/614 |
| 241,909 | 5/1881 | Bell et al. | 455/614 |
| 1,523,670 | 1/1925 | Sutlive | 181/174 |
| 1,757,938 | 5/1930 | Hayes | 179/180 |
| 4,284,858 | 8/1981 | Nicholson | 455/614 |
| 4,284,921 | 8/1981 | Lemonon et al. | 179/110 A |
| 4,334,321 | 6/1982 | Edelman | 455/619 |
| 4,384,394 | 5/1983 | Lemonon et al. | 29/25.35 |
| 4,401,911 | 8/1983 | Ravinet et al. | 310/800 |
| 4,440,983 | 4/1984 | Facoetti et al. | 179/110 A |

FOREIGN PATENT DOCUMENTS

| | | | |
|---|---|---|---|
| 1167898 | 4/1964 | Fed. Rep. of Germany | 179/180 |
| 2639822 | 12/1977 | Fed. Rep. of Germany | 455/619 |

*Primary Examiner*—Joseph A. Orsino, Jr.
*Attorney, Agent, or Firm*—Brady, O'Boyle & Gates

[57] ABSTRACT

A sound producing diaphragm of low density, low heat capacity, a large coefficient of thermal expansion and a large Young's modulus is located adjacent the end of an optical fiber transmission line element which is adapted to propagate modulated light and transmit the light outwardly therefrom particularly from the end region thereof to the surface of the diaphragm. The diaphragm absorbs light transmitted from the end region of the fiber optical element which heats and cools in response to the light energy absorbed thereby to expand and contract and produce a sound field. As a transducer in a telephone receiver, the diaphragm is mounted in the earpiece with the end of the optical fiber transmission line located in close proximity thereto and having an enlarged end which includes an anti-reflective coating so that light propagated along the fiber is transmitted to the diaphragm and not reflected back down the fiber.

22 Claims, 6 Drawing Figures

FIG.1
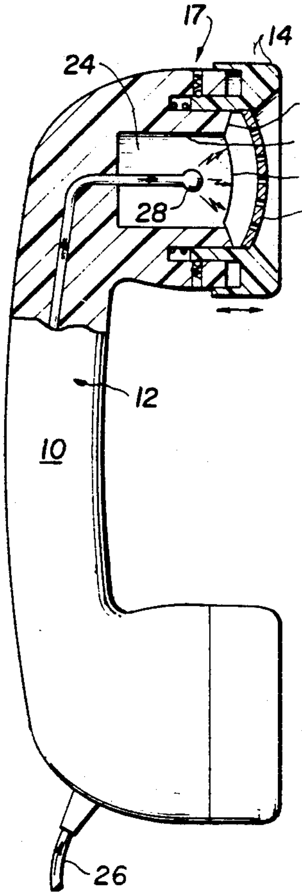
FIG.2
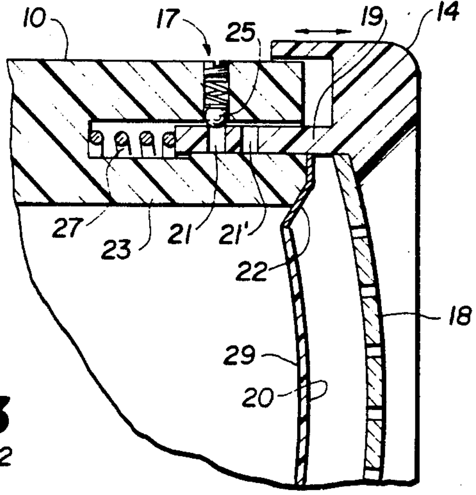
FIG.3
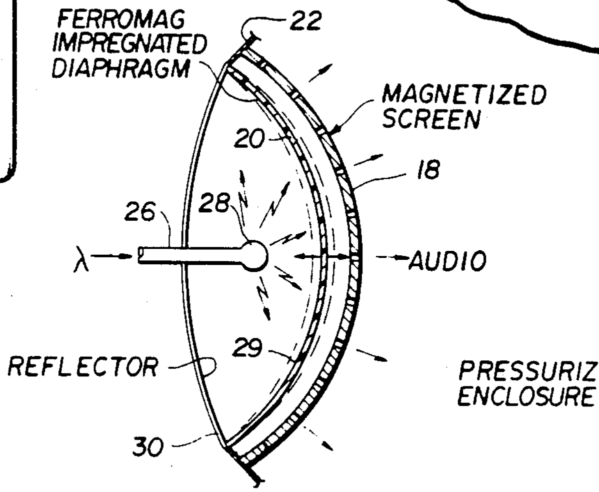
FIG.4
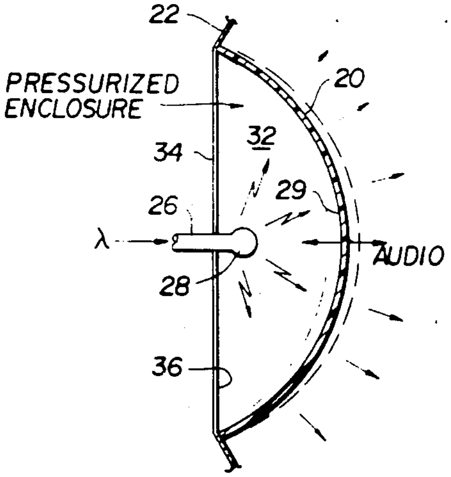
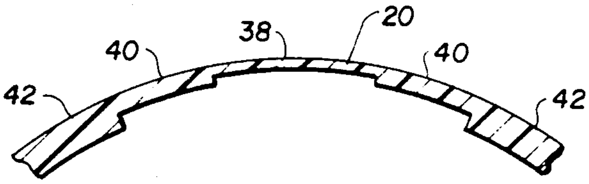
FIG.5
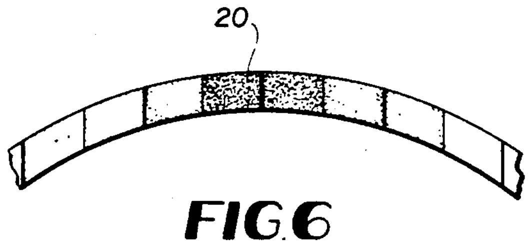
FIG.6

OPTO-ACOUSTIC TRANSDUCER FOR A TELEPHONE RECEIVER

BACKGROUND OF THE INVENTION

This invention relates generally to optical to acoustical transducer means and more particularly to such transducer means employed in a telephone receiver to produce a sound field over the audible range.

Optical acoustical telephones are known. A typical example is shown and discussed in U.S. Pat. No. 4,002,897, entitled, "Optical Acoustical Telephone Receiver", issued to D. A. Kleinman, et al. on Jan. 11, 1977. This patent discloses and telephone receiver for converting optical signals propagated through an optical fiber waveguide into audible acoustic signals by the inclusion of a small optical absorption chamber filled with optical absorbing material, such as dark fibrous material.

More recently, Seymour Edelman, one of the present inventors, was granted a patent on an improvement in such a device The patent is identified as U.S. Pat. No. 4,334,321, entitled, "Opto-Acoustic Transducer And Telephone Receiver", issuing on June 8, 1982. Shown and described therein is a telephone receiver in which information in the form of variations in the intensity of light transmitted along an optical fiber is converted to sound. The variations of light intensity, commonly known as modulated light, are absorbed in a specially treated short length of optical fiber coupled to a diaphragm located in the earpiece of a telephone housing. The absorbing length of the optical fiber becomes heated and cooled as the intensity of the light varies and accordingly expands and contracts, causing a movement of the diaphragm which sets up a sound field transmitted to the ear of a person utilizing the telephone receiver.

SUMMARY OF THE INVENTION

Accordingly, it is an object of the present invention to provide an improvement in optical to acoustical transducers.

It is a further object of the present invention to provide a new and useful improvement in opto-acoustic telephone apparatus.

Still a further object of the present invention is to provide an improvement in the construction of an optoacoustic telephone receiver which utilizes optical fibers.

Briefly, the subject invention is directed to an opto-acoustic transducer particularly adapted for use in a telephone receiver located at the end of an optical fiber transmission line element which propagates modulated light energy. The transducer includes the receiver end of the optical fiber transmission line and a flexible sound producing diaphragm which absorbs light transmitted from the end of the optical fiber. The diaphragm heats and cools in response to the varying light intensity absorbed and in the process expands and contracts to form a sound field which is directed from receiver earpiece to the ear of a listener.

BRIEF DESCRIPTION OF THE DRAWINGS

The following description will be more readily understood when considered in light of the drawings in which:

FIG. 1 is a side elevation, partly in cross section, of a telephone receiver incorporating the present invention;

FIG. 2 is an exploded sectional view, illustrative of the detent mechanism utilized in the receiver shown in FIG. 1;

FIG. 3 is an enlarged schematic side elevational view of one embodiment of an opto-acoustic transducer utilizable in the telephone receiver shown in FIG. 1;

FIG. 4 is an enlarged schematic side elevational view of another embodiment of an opto-acoustic transducer utilizable in the telephone receiver shown in FIG. 1;

FIG. 5 is an enlarged fragmentary view of one form of acoustic diaphragm utilized in the embodiments shown in FIGS. 3 and 4; and FIG. 6 is an enlarged fragmentary view of another form of acoustic diaphragm utilized in the embodiments shown in FIGS. 3 and 4.

DESCRIPTION OF THE PREFERRED EMBODIMENTS

With reference to the drawings, it should be pointed out that the various elements shown are not necessarily drawn to scale so that the inventive features to be set forth in the following detailed description will be more readily discernible. Accordingly, reference will be first made to FIG. 1 wherein reference numeral 10 designates a telephone receiver comprised of a hand-held body portion 12 terminating in an earpiece 14 at one end and a mouthpiece 16 at the other end. Included along with the earpiece 14 is a spring loaded detent mechanism 17, the details of which are shown in FIG. 2, and a customary screen element 18 behind which is mounted a flexible diaphragm 20, the details of which form the basis of this invention and which will be considered subsequently. In its basic construction, however, the diaphragm 20 is of the type that absorbs light impinging on it and accordingly heats and cools in response to the intensity of the light absorbed and in the process expands and contracts to form a sound field. Accordingly, the diaphragm 20 is supported at its periphery by a mounting frame 22 secured to the receiver body portion 23 as shown in FIG. 2 so that it is in spaced relation to the screen 18. To the rear of the diaphragm 20 there is provided a chamber 24 wherein an optical fiber transmission line 26 fed through the body portion 12 of the telephone receiver terminates. The end 28 of the optical fiber transmission line 26 is formed, for example, into a spherical shape and an anti-reflective coating applied thereto so that substantially all of the intensity modulated light appearing at the end 28 is transmitted outwardly from the sphere toward the back surface of the diaphragm 20 while not being reflected back down the fiber 26 towards the source, not shown.

Referring now to FIG. 2, the earpiece 14 includes a flanged portion 19 having two holes 21 and 21' which are adapted to alternately engage a spring biased detent ball 25 which is located in the outer shoulder of the receiver body portion 23. The earpiece is adapted to move in and out of the receiver body portion 23 against the biasing action of a spring 27. The purpose of the movable earpiece 14 is to selectively move the screen element 18 toward and away from the diaphragm 20. As will be explained, movement of the screen element toward the diaphragm 20 will operate to damp certain resonances of the diaphragm.

The diaphragm 20 is fabricated from a material having low density, low heat capacity, a large coefficient of thermal expansion, and a large Young's modulus. For example, while the polymer polyethylene terephthalate appears at present to be the most desirable material, it should be noted that when desirable, other polymers may be utilized such as polyestyrene and viscose rayon. Still other materials may be utilized such as metals, metal alloys, glasses and composites.

In its preferred form, a high emissivity coating 29 is applied to the back surface of the diaphragm 20 facing the end 28 of the optical fiber 26 to enhance or augment both the light absorption and the heat radiation characteristics of the material of which the diaphragm is formed. The diaphragm 20, moreover, is curved preferably with a concave inner surface constituting the surface oriented toward the spherical end 28 of the optical fiber 26. Since the diaphragm is constrained along its perimeter, it will bulge and retract as it alternately heats and cools. As a consequence, it is desirable to make the diaphragm 20 as thin as possible to more fully utilize the heating and cooling characteristic. When desirable, however, it should be noted that the material from which the diaphragm is constructed can itself be made to be light absorptive thus obviating the need for the coating 29.

Since the diaphragm 20 expands upon being heated and contracts upon being cooled, it operates to change the volume of the space in the cavity between the telephone earpiece and the ear of the user. It is well known in acoustics that, for the rapid changes characteristic of sound, adiabatic conditions apply and the relationship of pressure to volume is given by the equation:

$$PV^{\gamma}=\text{constant} \quad (1)$$

where P is the ambient pressure, V is the volume formed between the telephone earpiece and the ear, and $\gamma$ is the ratio of the specific heat of the air at constant pressure to the specific heat at constant volume. From this equation it follows that:

$$dP=-[(\gamma\cdot P)/V]dV \quad (2)$$

where dP is the sound pressure in the volume and dV is the change in volume caused by the expansion and contraction of the diaphragm. Accordingly, the expansion of the diaphragm reduces the volume of the space in the cavity between the telephone housing and the ear and contraction of the diaphragm increases the volume and changes of volume set up a sound field according to equation (2).

The present invention furthermore contemplates at least two different types of diaphragm assemblies which are illustrated in FIGS. 3 and 4.

Considering first FIG. 3, the diaphragm 20 is configured to have an extremely small thickness such that it is not able to maintain its curved shape by its own stiffness. The embodiment of FIG. 3 comprises a diaphragm 20 impregnated with ferro-magnetic material throughout its area. A magnetized screen 18 is positioned in front of the diaphragm 20 causing the diaphragm to be attracted toward it and thereby exhibit the desired curved shape including a concave rear inner surface oriented to the end 28 of the optical fiber 26. It is further shown that as the diaphragm vibrates back and forth in response to optical energy transmitted thereto from the fiber optic end 28 acoustic or audio energy will emanate outwardly therefrom through the magnetized screen 18. Additionally when it is desirable to enhance the absorption by utilizing substantially all of the light coming from the end 28 of the optical fiber 26, a curved reflector 30 is placed behind the end 28, as shown.

Next the embodiment of FIG. 3 discloses a relatively simple configuration wherein the flexible diaphragm 20 comprises the outer wall of a pressurized enclosure 32. The optical fiber 26 passes through a relatively rigid rear wall 34. By placing the interior of the enclosure 30 under pressure which is greater than the outside or surrounding pressure, the diaphragm 20 will assume the desired curved shape and will expand outwardly and contract inwardly in response to the heating and cooling of the diaphragm material as modulated light falls on the rear concave surface. When desirable, the rear wall 34 can include a reflective surface 36 to direct any rearwardly emanating light forward to concave surface of diaphragm 20.

Turning attention now to FIGS. 4 and 5, what is shown thereat are two different structural variations of diaphragms 20 shown in FIGS. 2, 3 and 4 for providing a substantially uniform frequency response over the audio range from 300 Hz to 3300 Hz. In the configuration shown in FIG. 5, the thickness of the polymer material from which the diaphragm 20 is constructed is selectively varied in discrete sections 38, 40 and 42 in order that different parts of the diaphragm have respective different resonance frequencies. By properly designing the various thickness sections, the desired frequency response can easily be achieved. Moreover, in the fabrication process a stamping die would be provided to press a diaphragm blank into the required thickness configuration.

The resonances of the sections 38, 40 and 42 of the diaphragm 20 shown in FIG. 5, furthermore, are adapted to be undamped when the telephone receiver is in the standby mode but are adapted to be damped when the telephone is in the conversational use mode. The undamped mode allows a "ring" signal to be sent from a calling source over the optical fiber transmission line 26 to the diaphragm 20 to alert a party to pick up the receiver. The damped mode allows the resonances to be flattened to provide a more uniform audio response to voice signals being transmitted over the optical fiber transmission line. The damping for the types of diaphragms utilized by the subject invention is controlled by moving the screen element 18 outward for the standby mode and inward for the conversational mode which is achieved by movement of the earpiece 14. Reducing the space between the diaphragm 20 and the screen 18 causes viscous damping due to the movement of the air between these elements. Moving the screen 18 away from the diaphragm 20 by pulling the earpiece outward increases the air space permitting the resonances to be undamped and accordingly a sharp "ring" signal will be readily heard.

With reference to the configuration shown in FIG. 6, there a diaphragm 20 is shown which is fabricated from a polymer whose elasticity or density is varied either in steps or gradually as shown over its exposed area as required to provide regions having different resonance frequencies for providing the desired frequency response over the normal audible range utilized in telephone apparatus.

It can be readily observed that the invention described above possesses the ability to convert audio frequency signals which are modulated onto a light beam and propagated by optical fibers into sound waves. The essence of the invention lies in the ability of the diaphragm itself to absorb the modulated light which thereafter thermally expands and subsequently cools and contracts to generate a sound field due to the change of the volume of space between a telephone earpiece and the ear of the listener.

It is to be understood that the embodiments of the invention shown herein and described in detail are to be taken as illustrative examples and are not meant to be considered in a limiting sense inasmuch as various changes in the material, shape, size and arrangement of the elements may be resorted to without departing from the spirit and scope of the invention as defined in the subjoined claims.

We claim:

1. An opto-acoustical transducer for use in a telephone receiver or the like and including light transmission line means and a cavity, between the earpiece of the receiver and the ear of a user, covered by a diaphragm, comprising:

a directly illuminated, expansible, elastic audible sound-producing diaphragm secured to a fixed rim, means for producing tension and curvature of the diaphragm for causing its shape to form a shallow segment of a sphere, said diaphragm being further comprised of light-absorbing material and positioned so as to receive light from said light transmission line means, said diaphragm being operable to directly absorb light from said light transmission line means to produce sound by being heated and cooled in response to the modulated light absorbed and accordingly expanding and contracting, the expansion and contraction acting with the tension in the diaphragm and the fixed rim to change the shape of the diaphragm which thereby imposes changes in the volume of the cavity covered by the diaphragm, with the consequent changes in pressure in the cavity being sensed as sound.

2. A transducer as defined by claim 1 wherein said diaphragm further includes a relatively high emissivity coating for enhancing the absorption of said light.

3. A transducer as defined by claim 1 wherein said diaphragm includes a curved concave surface facing said light transmission line means.

4. A transducer as defined by claim 1 wherein said sound producing diaphragm means comprises a relatively thin generally dome shaped diaphragm.

5. A transducer as defined by claim 1 wherein said diaphragm is formed of material having low density, low heat capacity, a large coefficient of thermal expansion and large Young's modulus.

6. A transducer as defined by claim 5 wherein said material comprises a polymer.

7. A transducer element as defined by claim 5 wherein said material comprises a polymer selected from the group including polyethylene terephthalate, polystyrene and viscose rayon.

8. A transducer element as defined in claim 5 wherein said material comprises polyethylene terephthalate.

9. A transducer as defined by claim 5 wherein said diaphragm additionally forms one wall of a pressurized enclosure, said diaphragm being adapted to bulge outwardly and thereby produce said tension and curvature.

10. A transducer as defined by claim 1 wherein said light transmission line means includes an optical fiber having an anti-reflecting coating at the diaphragm end so that light translated along the optical fiber element is transmitted therefrom to said diaphragm and not reflected back down the fiber.

11. A transducer as defined by claim 10 wherein said diaphragm end of the optical fiber includes an enlarged generally spherical end portion.

12. A transducer as defined by claim 1 wherein said diaphragm is impregnated with ferromagnetic material and additionally including magnetized means located outwardly from said diaphragm to attract said diaphragm for producing said tension and curvature.

13. A transducer as defined by claim 12 wherein said magnetized means comprises a curvilinear structure.

14. A transducer as defined by claim 12 wherein said magnetized means comprises a concavo-convex magnet structure having a concave face facing said diaphragm.

15. A transducer as defined by claim 1 wherein said diaphragm includes plural sections having relatively different resonance characteristics for providing respective different resonance frequencies over the audio frequency range for providing a desired frequency response.

16. A transducer as defined by claim 15 wherein said plural sections comprise sections of mutually different thicknesses.

17. A transducer as defined by claim 15 wherein said plural sections comprise sections of mutually different elasticity.

18. A transducer as defined by claim 15 wherein said plural sections comprise sections of mutually different density.

19. A transducer as defined by claim 18 and additionally including means for selectively damping the resonance frequencies of said plural sections.

20. A transducer as defined by claim 19 wherein said means for damping comprises means adjacent said diaphragm and being movable in relation to said diaphragm for changing the airspace therebetween.

21. A transducer as defined by claim 20 wherein said damping means comprises a screen located in a movable earpiece of said telephone receiver.

22. A transducer as defined by claim 21 wherein said earpiece includes detent means for providing at least two discrete stationary positions of said screen relative to said diaphragm.

* * * * *